Aug. 28, 1956 E. G. HILLS 2,761,129
APPARATUS FOR LOCATING A MISSILE PROJECTING DEVICE
Filed Oct. 28, 1952 2 Sheets-Sheet 1

INVENTOR.
E. G. HILLS
BY
Harry M. Saragovitz
Attorney

Aug. 28, 1956　　　　　　　　E. G. HILLS　　　　　　　　2,761,129
APPARATUS FOR LOCATING A MISSILE PROJECTING DEVICE
Filed Oct. 28, 1952　　　　　　　　　　　　　　　　2 Sheets-Sheet 2
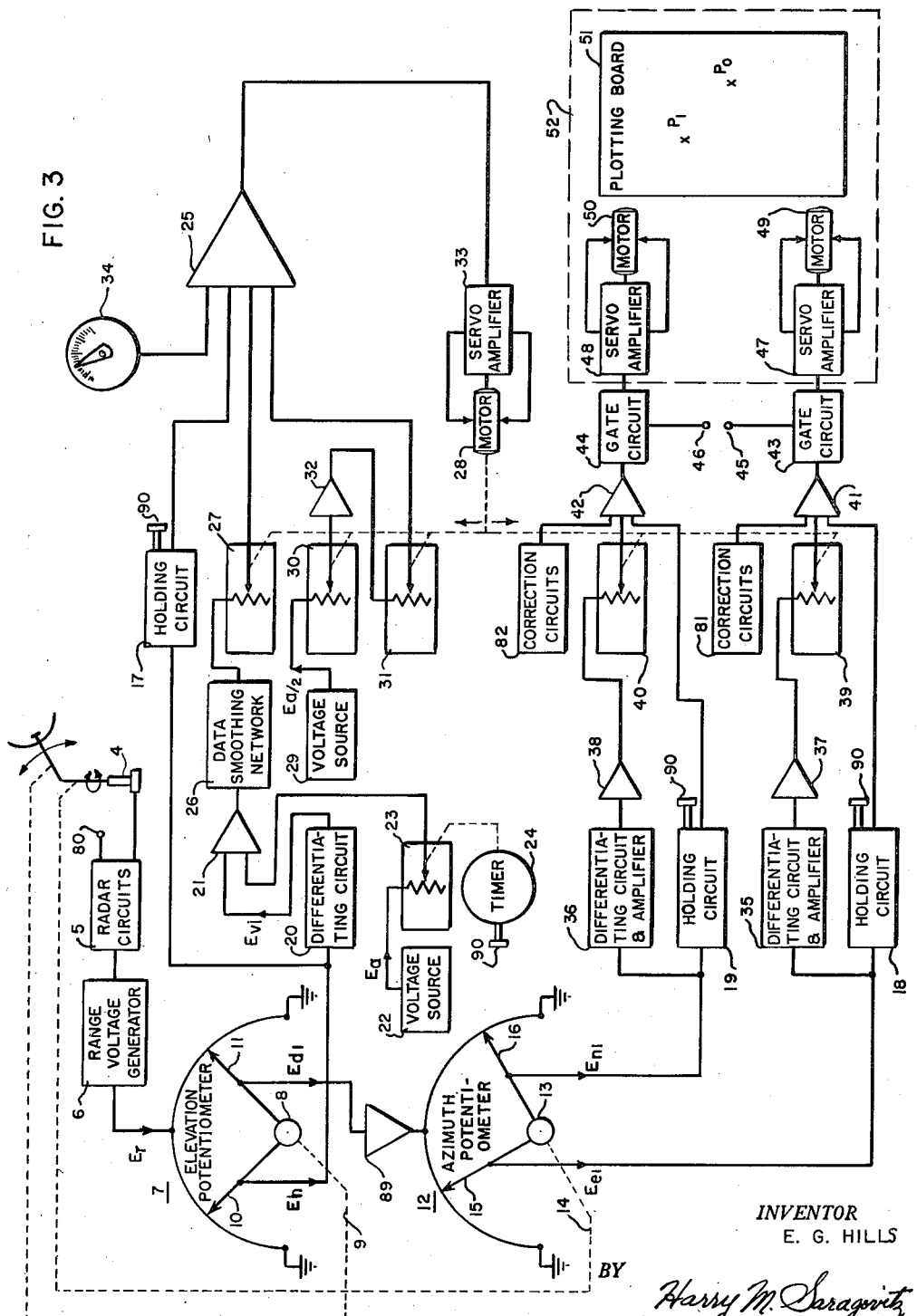
INVENTOR
E. G. HILLS
BY
Harry M. Saragovitz
Attorney

United States Patent Office 2,761,129
Patented Aug. 28, 1956

2,761,129

APPARATUS FOR LOCATING A MISSILE PROJECTING DEVICE

Elmer G. Hills, Des Plaines, Ill., assignor to the United States of America as represented by the Secretary of the Army Application October 28, 1952, Serial No. 317,183

20 Claims. (Cl. 343—7)

This invention relates to a system for determining the location of a missile projecting device.

Prior to the present invention, the location of a missile projecting device was plotted by tracking the missile utilizing a tracking radar, which furnished a certain trajectory. This curve was extrapolated to determine the point of origin of the missile in question. The invention utilizes tracking radar but obviates the necessity for extrapolating a curve. Voltages derived from the tracking radar and associated apparatus, that are proportional to the velocity of the missile and the distance of the missile at a particular time from the tracking radar, when properly combined, indicate the position of the missile projecting device by the use of rectangular coordinates on a plotting board.

Therefore, it is a primary object of this invention to provide a system for locating a missile projecting device quickly and accurately.

It is another object of this invention to provide a system for locating a missile projecting device by tracking the projected missile and utilizing data obtained thereby to plot the position of the projecting device.

It is a further object of this invention to provide a system for locating a missile projecting device by tracking the projected missile and utilizing data obtained thereby together with correction data to plot the position of the projecting device.

These and further objects of this invention will be more fully understood when the following description is read together with the accompanying drawings in which:

Fig. 3 is a schematic diagram in block form of the invention.

In general, the invention comprises a tracking radar operating in conjunction with a computer. As the radar is tracking a particular missile, the operator actuates a control which effectively holds several voltages representing distance. This actuation will hereafter be referred to as the initial observation. The voltages representing the distance to this initial observation point from the radar and other voltages representing the velocity of the missile at such observation point are combined and utilized to control servo motors, which position a marker on a plotting board at a point representing the missile projecting device.

Figure 1:
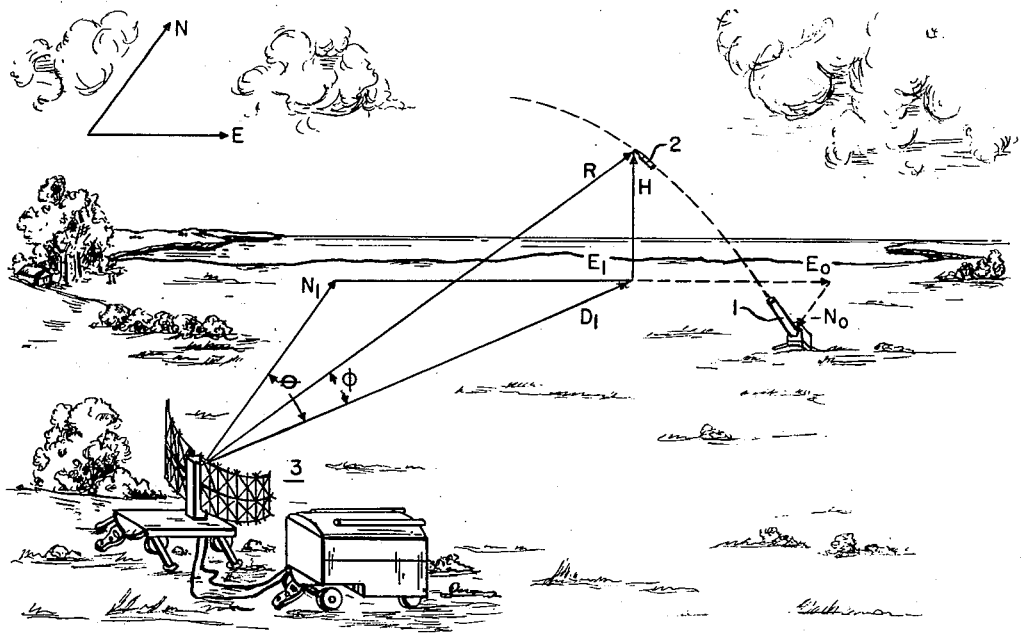
Fig. 1 is a perspective overall view of a system embodying the invention.

Referring to Fig. 1, an overall view in perspective of a problem in locating a missile firing device 1 such as a gun or mortar is presented. The missile 2 follows a trajectory shown by a broken line. Remote from the device 1 is a tracking radar and computer 3, shown tracking missile 2. The various distances, including the rectangular coordinates thereof and correction distances, are illustrated to aid in the explanation of the system.

Tracking radar and computer 3 are illustrated in Fig. 3 in schematic block diagram form. The radar antenna support and rotator 4 may comprise any conventional arrangement and form no part of the invention. Arrows indicate the movement of the antenna in azimuth and elevation. Conventional radar tracking circuits are included in radar circuits 5, the specific arrangement of which forms no part of this invention. Such tracking is usually automatic but may be performed manually if desired. Connected to these circuits is a range voltage generator 6, which functions to generate a voltage $E_r$ proportional to the distance of the target from the radar set.

Radar tracking systems and range voltage generator circuits may be found in volume 20, chapters 2 and 9, of the Radiation Laboratory Series entitled "Electronic Time Measurements," published in 1949 by McGraw-Hill Company. It is to be emphasized that the details of these circuits form no part of the present invention, since any suitable tracking radar and range voltage generator circuit may be utilized in this system.

The range voltage is applied from generator 6 to an elevation potentiometer 7 which has sine cosine characteristics. Such potentiometers are well known, and it will be sufficient to say that the output from arms 10 and 11 will be proportional to the sine and cosine respectively of the angle through which shaft 8 has been rotated. An extensive discussion of such potentiometers may be found in volume 21, chapter 5, of the Radiation Laboratory Series entitled "Electronic Instruments," published in 1948 by McGraw-Hill.

Figure 2:
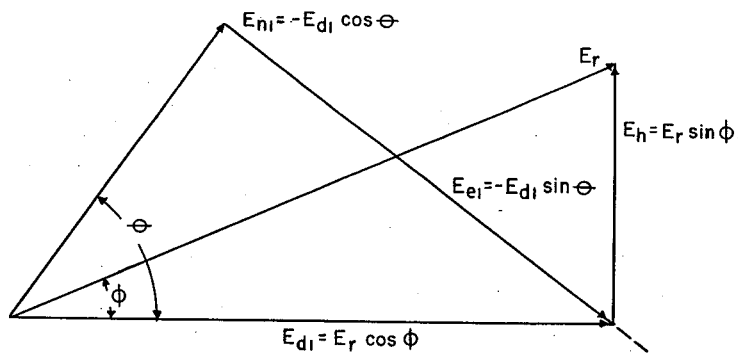
Fig. 2 is a diagram of voltages representing distance utilized in determining the position of a missile projecting device.

Potentiometer 7 includes a shaft 8 which controls the position of arms 10 and 11 which are displaced 90 degrees. This shaft is rotated in accordance with the angle of elevation $\phi$ of antenna 4, by any conventional type mechanical or electrical linkage, shown on the drawing as a broken line 9. Therefore, the output voltages of arms 10 and 11, which will be voltages $E_r \sin \phi$ and $E_r \cos \phi$ respectively, will be represented by $E_h$ and $E_{d1}$, as shown in Fig. 2. It can be seen that $E_h$ and $E_{d1}$ are voltages representing the vertical height of shell 2 and the horizontal distance of shell 2 from radar 3 at any instant.

$E_{d1}$ is applied to a second sine cosine potentiometer 12, which may be similar to potentiometer 7, through amplifier 89. A shaft 13 of this potentiometer is rotated in accordance with the rotation of antenna 4 in azimuth angle $\theta$, such rotation being accomplished by any convenient mechanical or electrical linkage indicated by a broken line 14. A pair of wiper arms 15 and 16, arranged at 90 degrees, are positioned in accordance with the rotation of shaft 13. Therefore, the output voltages of arms 15 and 16, which will be voltages $=E_{d1} \sin \phi$ and $-E_{d1} \cos \phi$ respectively, will be represented by $E_{e1}$ and $E_{n1}$, as shown in Fig. 2. It can be seen that $E_{e1}$ and $E_{n1}$ are voltages representing the rectangular coordinates of the voltage $E_{d1}$ and therefore, the horizontal distances of shell 2 from radar 3.

At this point voltages are available that will locate the position of shell 2 in relation to radar 3. It is still necessary to locate missile firing device 1, and this is accomplished by combining the voltages previously obtained by reason of the position of shell 2 with voltages proportional to the velocity of the shell.

The well known equation expressing distance in relation to velocity, acceleration and time is as follows:

$$S = V_o t + \tfrac{1}{2} a t^2 \qquad (1)$$

These terms will be replaced by the following voltages representing distance, velocity and acceleration at the initial observation point, thus:

$S = E_h$—voltage representing height of shell at initial observation point $V_o = E_{vo}$—voltage representing velocity at initial observation point $t = T$—time elapsed between launching of missile 2 and initial observation of missile 2

$a = E_a$—voltage representing acceleration of missile 2 therefore:

$$E_h = E_{vo}T + \tfrac{1}{2}E_aT^2 \qquad (2)$$

If the terms of Equation 2 can be obtained and a solution for T made, the position of the missile projecting device 1 may be determined from correction voltages derived by multiplying the voltage representing horizontal velocity components of the missile by the voltage T. To provide these terms, various circuit elements, shown in Fig. 3, are utilized as will now be described in detail.

The voltage representing missile elevation, $E_h$, and the two voltages representing the rectangular coordinates of the horizontal distance to the missile, $E_{el}$ and $E_{nl}$ are applied to holding circuits 17, 18 and 19 respectively. These circuits hold the voltages applied to them at a constant level at the instant the operator actuates control knobs 90, regardless of subsequent variations of the applied voltages. Such knobs are interconnected but for clarity in the drawing, are shown as separate controls on each holding circuit.

Voltage $E_h$ is applied to a summing amplifier 25 through holding circuit 17. Voltage $E_h$ is also differentiated by a differentiating circuit 20 to produce a voltage $E_{vi}$, representing the instantaneous vertical velocity of missile 2, which is applied to a conventional summing amplifier 21. A discussion of this type direct-coupled amplifier as well as other computer feedback amplifiers used in the present invention may be found in volume 18, chapter 11, Radiation Laboratory Series entitled "Vacuum Tube Amplifiers," published in 1948 by Mc-Graw-Hill Company. It is obvious that the details of such amplifiers form no part of this invention.

Also applied to summing amplifier 21 is a voltage $E_aT_2$, representing the velocity change of missile 2 due to gravity. It is obtained by the application of a suitable voltage $E_a$ from a source 22, such voltage representing acceleration due to gravity, to a potentiometer 23 which is driven in accordance with a timer 24. Timer 24 is started by control button 90, and therefore the output of potentiometer 23 is voltage $E_aT_2$ where $T_2$ is the time interval after the actuation of the control button 90. Potentiometer 23 is designed so that $E_aT_2$ will be equal at any instant to the decrease in $E_{vi}$. Amplifier 21 adds and inverts these voltages to supply an output voltage $-E_{vo}$ which represents the vertical velocity of missile 2 at the time of initial observation. A data smoothing network 26 may be utilized to provide a more constant output to potentiometer 27.

In other words, since the voltage $E_{vi}$ representing the vertical velocity of the missile is decreasing at a constant rate, a correction voltage $E_aT_2$ equal to such decrease must be added to voltage $E_{vi}$ to hold voltage $E_{vo}$ at a constant level throughout the observed flight of missile 2.

If it becomes desirable to take into account the decrease of vertical velocity of missile 2 due to air resistance, which becomes a greater factor as the missile speed increases, the voltage $E_a$ may be variably increased in response to actuation of button 90, or the potentiometer 23 may be wound in a non-linear manner.

A potentiometer 27 is controlled by a servomotor 28 which, as will be more fully explained below, solves for time T. The output of potentiometer 27, which will be the voltage $-E_{vo}T$ when the servomotor 28 has turned to its final position, is applied to summing amplifier 25.

In order to obtain term $\tfrac{1}{2}E_aT^2$ in Equation 2, it is necessary to utilize a voltage source 29, two multiplying potentiometers 30, 31 and an amplifier 32. A voltage $E_a/2$ is supplied by source 29 through potentiometer 30, amplifier 32 and potentiometer 31 to amplifier 25. The potentiometers are controlled by servomotor 28 so that the voltage supplied to amplifier 25 is $-\tfrac{1}{2}E_aT^2$, the negative sign being due to the inversion by amplifier 32. This amplifier, as well as other amplifiers in this system utilized in the output circuits of potentiometers have high input impedance to eliminate any loading of the potentiometers.

Voltages $E_h$, $-E_{vo}T$ and $-\tfrac{1}{2}E_aT^2$ are added by summing amplifier 25, the output of this circuit being fed to a servo amplifier 33 which controls servomotor 28. This motor will rotate until the input voltage to its servo amplifier 33 is zero. When this occurs, the servomotor stops and the position of its output shaft represents T, the solution to the equation for the time of flight of the missile up to the initial missile observation point.

An elevation dial 34 is provided to supply a fourth voltage to the input of amplifier 25. This voltage corrects for any difference in elevation between radar 3 and missile projecting device 1, it being assumed that the device 1 is at the same elevation as the terrain under missile 2 at the initial observation point. The determination of such elevation difference is explained below.

Consideration will next be given to the output voltages of azimuth potentiometer 12 and associated circuits. Voltages $E_{el}$ and $E_{nl}$ from arms 15 and 16 represent the rectangular coordinates of the horizontal position of missile 2 with respect to radar 3. At the initial observation time, these voltages are held by holding circuits 18 and 19, described above. $E_{el}$ and $E_{nl}$ are also differentiated and amplified by the differentiating circuits and amplifiers 35 and 36 and the resultant voltages $-E_{ve}$ and $-E_{vn}$ representing, respectively, the horizontal velocities of the missile 2 east and north are applied to potentiometers 39 and 40 through amplifiers 37 and 38. These potentiometers are controlled by servomotor 28 so that their output voltages will be $E_{ve}T$ and $E_{vn}T$. These voltages are added to $E_{el}$ and $E_{nl}$ in summing amplifiers 41 and 42, the resulting voltages $E_{eo}$ and $E_{no}$ representing the rectangular coordinates of the missile projecting device 1. Either $E_{eo}$ or $E_{no}$ may be positive or negative, and in the latter case, it is obvious that such terminology as south and west could be substituted for such negative values of north and east. However, for clarity, the positive and negative north and east terminology has been used herein.

If it is desirable to compensate for the decrease in horizontal velocity due to air resistance, and the shift of the missile in flight due to missile spin and wind, distance correction voltages may be introduced into the east and north rectangular coordinate channels. This is accomplished by correction circuits 81 and 82, these circuits developing the necessary voltages representing distance correction, such voltages being added to the other voltages representing distance by amplifiers 41 and 42.

Voltages $E_{eo}$ and $E_{no}$ are fed to servo amplifiers 47 and 48 through gate circuits 43 and 44. These latter circuits are controlled by a screening voltage obtained from terminal 80 of radar circuits 5. When the orientation of antenna 4 reaches a position such that useful information concerning the missile can no longer be obtained or the tracking radar loses the missile, a negative gate voltage is generated by radar circuits 5 at terminal 80 which is connected to terminals 45, 46 of gate circuits 43, 44. This prevents any further information being fed to servo amplifiers 47, 48. This connection is not shown in Fig. 3 for simplicity.

Two servomotors 49 and 50 control any conventional mechanical, electro-mechanical, or electronic marker on a plotting board 51, and these motors in turn operate in response to the voltages fed into their respective servo amplifiers 47, 48. The above described units may all be located in a plotting unit 52 for convenience in construction and operation.

The system operates in the following manner. The radar operator locates a missile and places the radar on track, the corrective voltages from circuits 81 and 82 being set from previous experience if they are to be utilized, and the time T set at zero. The radar operator then locates and tracks a missile, which will be represented by the marker at point $P_1$ on the plotting board. This is due to the fact that since $T=0$, voltages $E_{ve}T$ and $E_{vn}T$ will be zero. The operator next operates hold control knobs 90 which initiates operation of timer 24 and holds the input voltages of circuits 17, 18 and 19. At the same time, point $P_1$ is marked on the plotting board so that the difference in elevation of this point with the radar position may be calculated by use of contour lines previously placed on plotting board 51. This difference is set on elevation dial 34 which feeds a corrective voltage into amplifier 25.

A unitary device may be utilized for marking the position of $P_1$ on the plotting board and operating button 90. This may comprise a marking stylus attached to the end of a push button switch, which when depressed, closes circuits in the hold circuits 17, 18 and 19 and timer 24 to start operation thereof.

The marker on the plotting board 51 will now move to position $P_0$ as Equation 2 is solved for T and servo-motors 49 and 50 operate. This position will initially move about slightly as the data is being gathered and corrected by the computer. If the target disappears for a predetermined length of time or the screening angle of the radar antenna 4 is reached, gates 43 and 44 will block any further information from servo amplifiers 47 and 48.

Although one embodiment of the invention has been described in detail, it is obvious that modifications may be made which fall within the scope and intent of this invention.

I claim:

1. In a system for locating a missile projecting device, a radar set including an antenna and associated circuits for generating a voltage representing the slant range of a missile, means for deriving voltages therefrom representing the rectangular coordinates of said range, one of said coordinate voltages representing the horizontal distance to said missile and the other representing the height of said missile, said distance and height voltages varying in response to the elevation of said antenna, means for deriving rectangular coordinate voltages from said horizontal distance voltage, an indicator responsive to said rectangular coordinate voltages to indicate the position of the missile in flight, computer means for deriving rectangular coordinate voltages representing the horizontal distance traversed by the missile from the missile projector to the point of first observation, and means for adding said distance voltages to the said rectangular coordinate voltages supplied to said indicator whereby the resultant position of the indicator gives the position of the missile projecting device; said computer means including first and second channels, said first channel responsive to said height voltage, the first time derivative thereof and the distance fallen through during flight wherefrom the time of flight is derived, said second channel responsive to said rectangular coordinate voltages, the first time derivative thereof, and said time of flight, wherefrom said rectangular distance voltages are derived.

2. A system as in claim 1 wherein said first channel includes an adjustable voltage generating device for providing a first correction voltage, said voltage compensating for the difference in elevation of said tracking means and said projecting device.

3. A system as in claim 2 wherein said second channel includes circuits for generating correction voltages to compensate for non-linearity in the flight of said missile.

4. In a system for computing the location of a missile projecting device, a radar antenna and circuits for locating and tracking a missile, means associated with said radar for generating a voltage representing missile range, an elevation sine cosine potentiometer having two wipers controlled in accordance with the elevation of said antenna, means for applying said range voltage to said elevation potentiometer so that the output voltages from said wipers represent the rectangular coordinates of said range, an azimuth sine cosine potentiometer having two wipers controlled in accordance with the azimuth of said antenna, means for applying said rectangular coordinate voltage representing missile horizontal distance to said azimuth potentiometer so that the output voltages from said azimuth potentiometer wipers represent rectangular coordinates of said horizontal distance, means for deriving from said range rectangular coordinate voltages data which is an indication of the time of flight of said missile to a predetermined point, an indicator, and computing means for combining said horizontal distance rectangular coordinate voltages and said data to render said indicator operative for displaying the position of said projecting device.

5. A system as in claim 4 wherein said data deriving means comprises a balancing system including multiplying potentiometers having controlled wipers, amplifiers and a servo amplifier and motor in a closed circuit, said potentiometer wipers controlled in accordance with the rotation of said motor.

6. A system as in claim 5 wherein an adjustable voltage generating device for providing a first corrective voltage is coupled to said closed circuit, said first corrective voltage compensating for the difference in elevation of said radar antenna and said projecting device.

7. A computer for locating the position of a missile projecting device comprising means responsive to a voltage proportional to the range of a missile from a ranging device for generating voltages proportional to the height and horizontal distance of said missile, means responsive to said horizontal distance voltage for generating voltages proportional to the rectangular coordinates of said horizontal distance a first channel having a circuit responsive to said height voltage, the first time derivative thereof, and a voltage representing the distance fallen through during flight deriving therefrom the time of flight, a second channel responsive to the aforesaid rectangular coordinate voltages, the first time derivative thereof and to said time of flight deriving therefrom resultant rectangular coordinate voltages; and an indicating device responsive to said resultant coordinate voltages to indicate the position of said missile projecting device.

8. A computer as in claim 7 wherein said first channel includes an adjustable voltage generating device for providing a corrective voltage to compensate for the difference in elevation between said ranging device and said projecting device.

9. A computer as in claim 8 wherein said second channel includes circuits for generating correction voltages to compensate for non-linearity in the flight of said missile.

10. In a system for computing the location of a missile projecting device, means for locating and tracking a missile, means for deriving voltages from said tracking means, said derived voltages representing the height, horizontal distance and rectangular coordinates of horizontal distance of said missile from said tracking means, a computer including two interconnected channels; one of said channels including means to convert said height voltage to a voltage representing the vertical velocity of said missile, means to receive said height voltage and said vertical velocity voltage for providing data representing the time said missile is in flight to a predetermined position; the other of said channels including an indicator, means to convert said rectangular coordinate voltages to voltages representing the velocity of said missile along said rectangular coordinates, means to receive said rectangular coordinate voltages, said last mentioned velocity voltages and said data for rendering said indicator operative to display the position of said projecting device.

11. A system as in claim 10 which includes an adjustable voltage generating device for providing a first correction voltage, said voltage compensating for the difference in elevation of said tracking means and said projecting device, said one channel including means for receiving said first correction voltage so that said output data is adjusted according to said elevation difference.

12. A system as in claim 11 which includes circuits for generating second correction voltages, said second correction voltages compensating for non-linearity in the flight of said missile, said second channel including means for receiving said second correction voltages so that said display on said indicator will more accurately display the position of said projecting device.

13. A system for locating a missile projecting device comprising a radar including an antenna for locating and tracking a missile, said radar operable for generating voltages representing the range of said missile; an elevation sine cosine potentiometer having two wipers controlled in accordance with the elevation angle of said antenna, means for applying said range voltage to said elevation potentiometer so that the wiper output voltages represent height and horizontal distance of said missile from said radar; an azimuth sine cosine potentiometer having two wipers controlled in accordance with the azimuth angle of said antenna, means for applying said horizontal distance voltage to said azimuth potentiometer so that the wiper output voltages represent the rectangular coordinates of said horizontal voltage; an indicator, a computer including two channels; one of said channels including a motor, a servo amplifier and a first summing amplifier with a plurality of inputs, said motor controlled by said servo amplifier, said servo amplifier connected to said summing amplifier, a holding circuit connected between said height wiper and one of said summing amplifier inputs, a first differentiating circuit and first multiplying potentiometer having one wiper, said first differentiating circuit and said first potentiometer series connected between said height wiper and one of said summing amplifier inputs, means connected in the output of said first differentiating circuit for compensating for changes in the output voltage of said circuit after a predetermined time, a voltage source, two second potentiometers each having one wiper, and means to connect said source and said second potentiometers in series to one of said summing amplifier inputs, said motor controlling said first and second potentiometer wiper arms so that a balance condition will be obtained in said one channel; the other of said channels including two identical circuit paths, each of said paths comprising a holding circuit connected to one of said rectangular coordinate wipers, a second differentiating circuit connected to said last mentioned wiper, a third multiplying potentiometer having a wiper, a second summing amplifier having a plurality of inputs, said last mentioned holding circuit connected to one of said second summing amplifier inputs, and the series combination of said second differentiating circuit and said third multiplying potentiometer connected to one of said second summing amplifier inputs, said third potentiometer wiper controlled by said first motor, a second motor, a second servo amplifier for controlling said motor; each of said second servo amplifiers responsive to the output signals from said second summing amplifiers for rendering said indicator operable to display the position of said projecting device.

14. A system as in claim 13 which includes an adjustable voltage generating circuit for providing first correction voltages for compensating for the difference in elevation of said radar and said projecting device, said first correction voltages coupled to one of said inputs of said first summing amplifier.

15. A system as in claim 14 which includes circuits for generating second correction voltages to compensate for non-linearity in the flight of said missile, said second correction voltage coupled to one of said inputs of each of said second summing amplifiers.

16. A system for indicating the location of a missile projecting device including, automatic tracking radar means for locating and tracking a missile in flight and having means providing voltages representing the azimuth, elevation, slant range, horizontal range and height of said missile and azimuth potentiometer means for resolving said horizontal range voltage into rectangular components; means for deriving from said height voltage and the time derivative thereof the time of flight of said missile; means for deriving from said rectangular component voltages and time derivatives thereof combined with said time of flight voltage additional rectangular component voltages representing the distance traversed during said time of flight; means for adding together corresponding rectangular component voltages; and an indicator responsive to the respective sums of said corresponding rectangular component voltages; whereby the position of said missile projecting device is indicated in rectangular coordinates.

17. In a system for computing the location of a missile projecting device including automatic tracking radar means for locating and tracking a missile in flight and having means providing a voltage representing height; means for deriving the time of flight from said height voltage which includes a differentiating circuit responsive to said height voltage generating therefrom a voltage representing vertical velocity, a circuit generating a voltage representing distance fallen through during the time of flight having two potentiometers connected in series and a fixed voltage source therefor, summing amplifier means adding together said height voltage, velocity voltage and distance voltage, and servomotor means responsive to the total voltage operatively connected to said potentiometers, whereby the motor rotates until said total voltage is reduced to zero and the position of its shaft represents the time of flight.

18. In a system for computing the location of a missile projecting device including automatic tracking radar means for locating and tracking a missile in flight and having means providing voltages representing elevation, slant range, horizontal range, height and the rectangular coordinate voltage components of horizontal range; means including a summing amplifier having input circuits providing voltages representing said height, vertical velocity multiplied by time, and the distance fallen through during the time of flight, potentiometer means in said input circuits developing voltages representing time, a servomotor responsive to the resultant output of said amplifier operatively connected to said potentiometers, whereby said servomotor rotates until the amplifier output is reduced to zero and the position of its shaft represents the time of flight of the missile.

19. The device defined in claim 18 and including two summing amplifiers responsive respectively to said coordinate voltages and to differentiated coordinate voltages combined with said time of flight, and an indicator responsive to the respective output voltages of said summing amplifiers, whereby the deflections of the indicator responsive to said coordinate voltage are supplemented by deflections representing the distance traversed by the missile during said time of flight.

20. A system for indicating the location of a missile projecting device including, automatic tracking radar means for locating and tracking a missile in flight and having means providing voltages representing the azimuth, elevation, slant range, horizontal range and height of said missile, and azimuth potentiometer means for resolving said horizontal range voltage into rectangular components; an indicator responsive respectively to said azimuth rectangular component voltages adapted to indicate the rectangular coordinate position of said missile, means responsive to said height voltage and its time derivative for determining the time of flight, differentiating circuit means responsive to said rectangular component voltages deriving voltage components representing rectangular component velocities, time deflected potentiometer means excited by said rectangular velocity component voltages providing rectangular component distance voltages, summing amplifiers adding together corresponding azimuth and distance voltages whereby the rectangular coordinate position of the indicator representing the position of the missile is supplemented by the rectangular components of distance traversed giving thereby the coordinate position of the projector.

References Cited in the file of this patent

UNITED STATES PATENTS 2,617,982   Holschuh et al. _____ Nov. 11, 1952

OTHER REFERENCES

Rand: "Radar for Field Artillery," Antiaircraft Journal, May-June 1952, pages 27–29.